March 18, 1952 R. J. CRISSY 2,589,676
SHEET DISTRIBUTING MACHINE
Filed Aug. 5, 1947 4 Sheets-Sheet 2
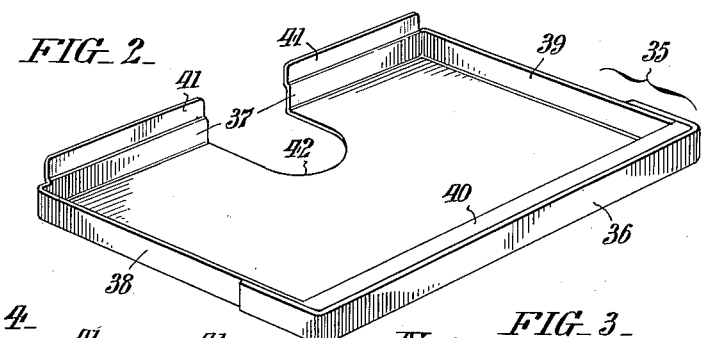
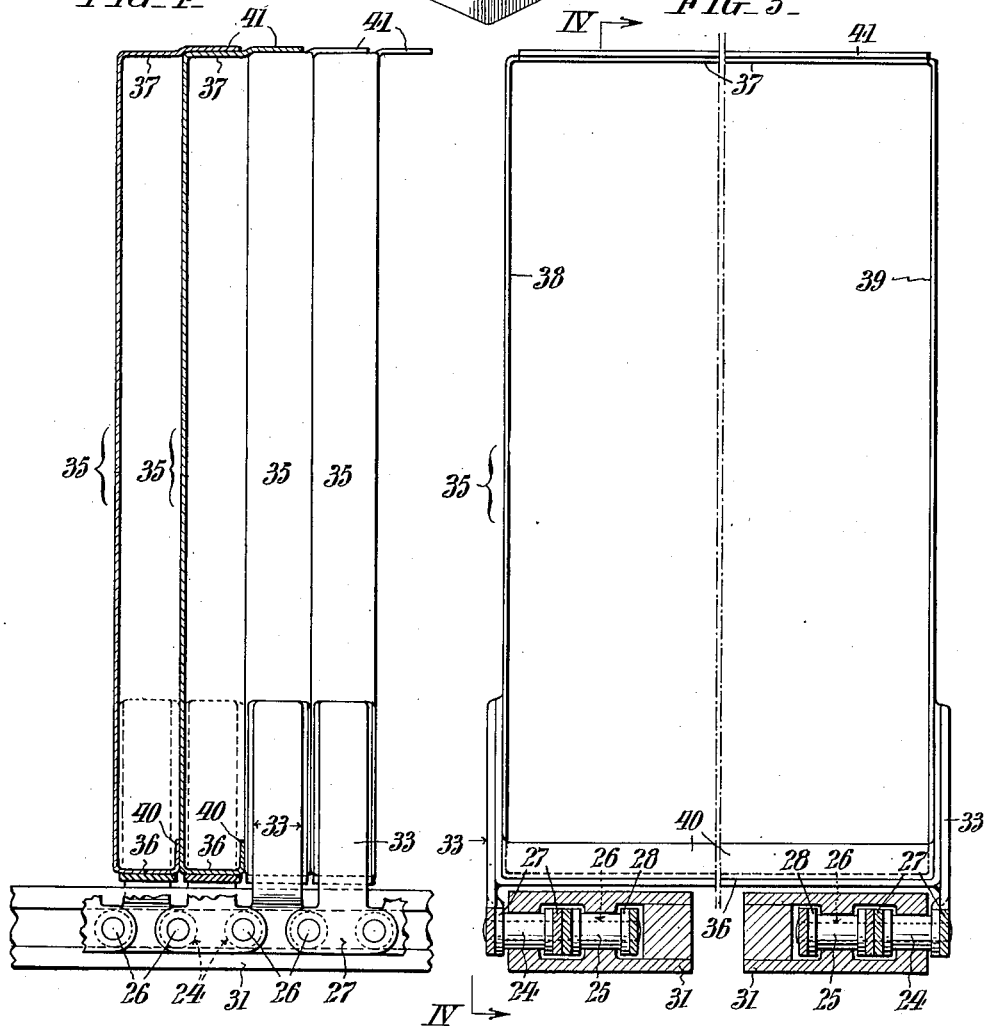
WITNESSES
INVENTOR:
Robert J. Crissy,
BY
ATTORNEYS.

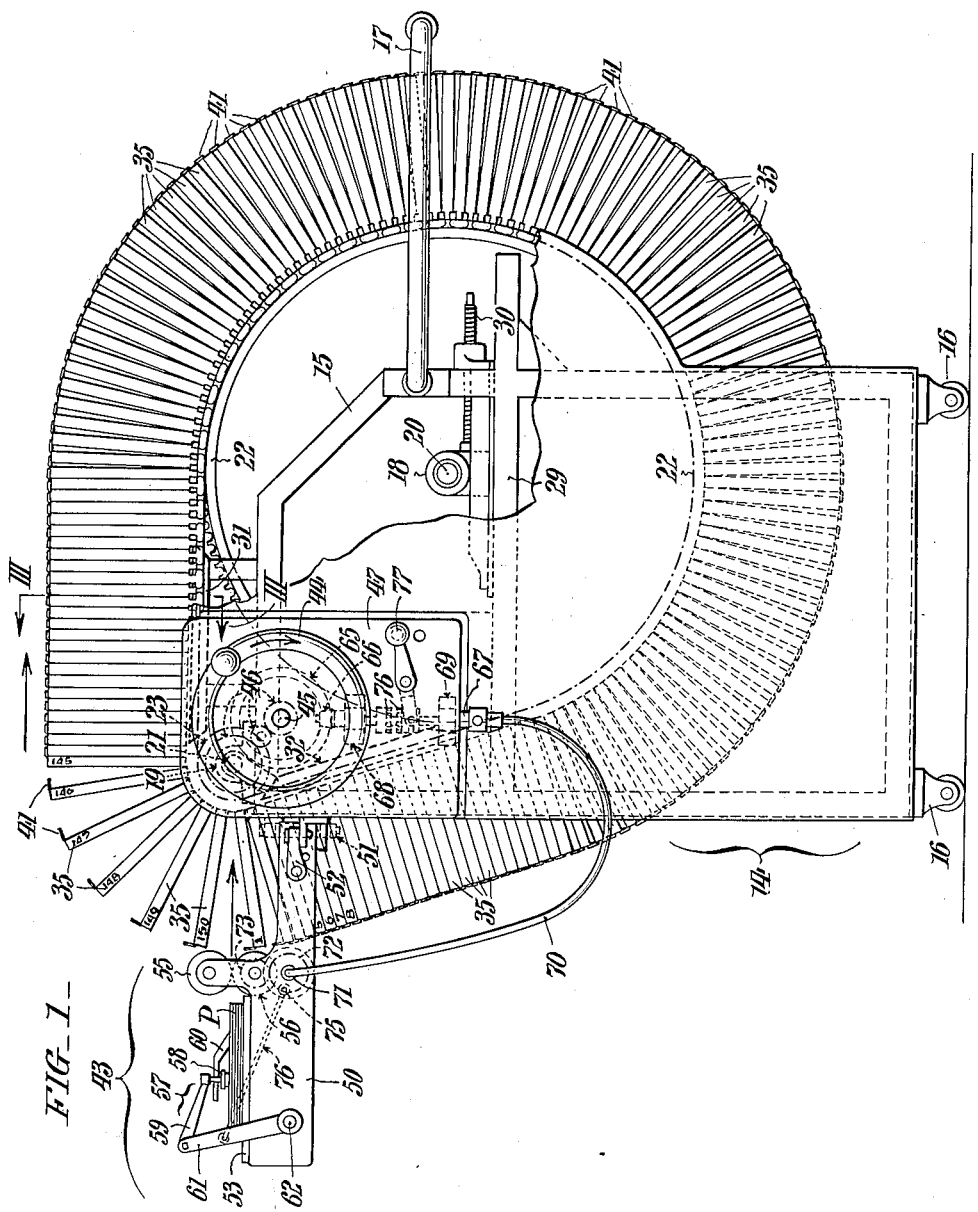
FIG_1_
INVENTOR:
Robert J. Crissy,
BY Paul & Paul
ATTORNEYS.

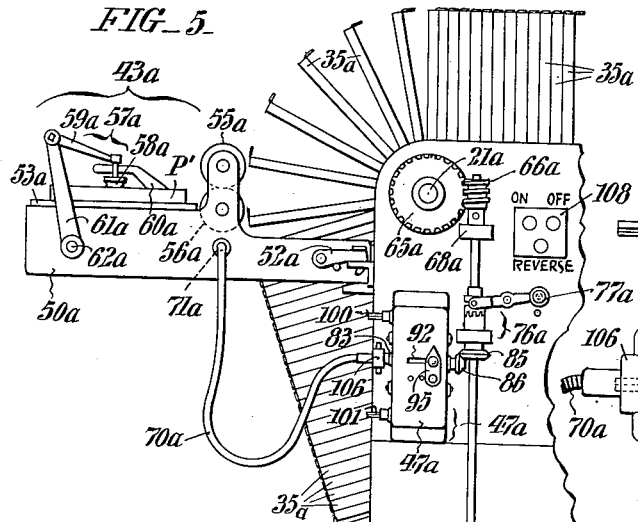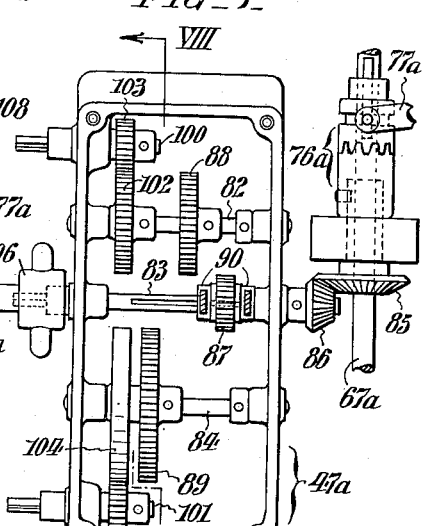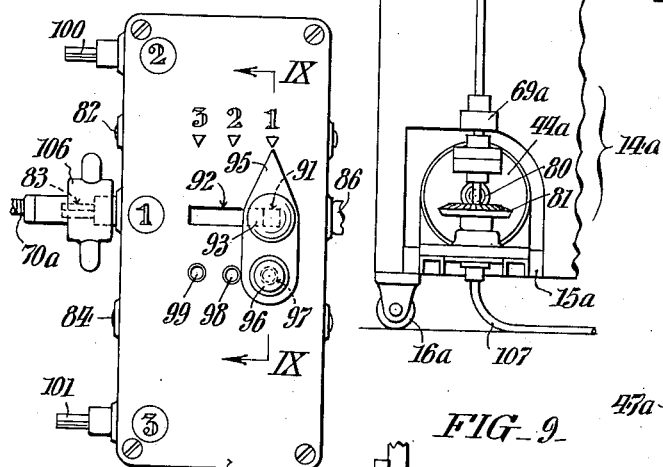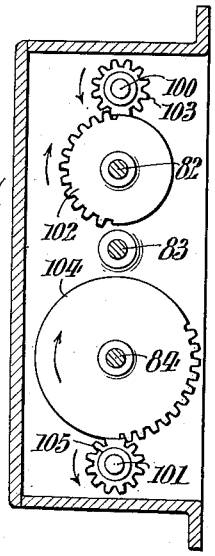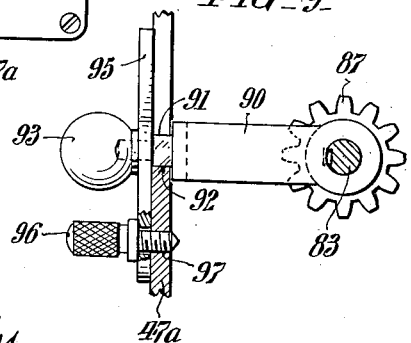

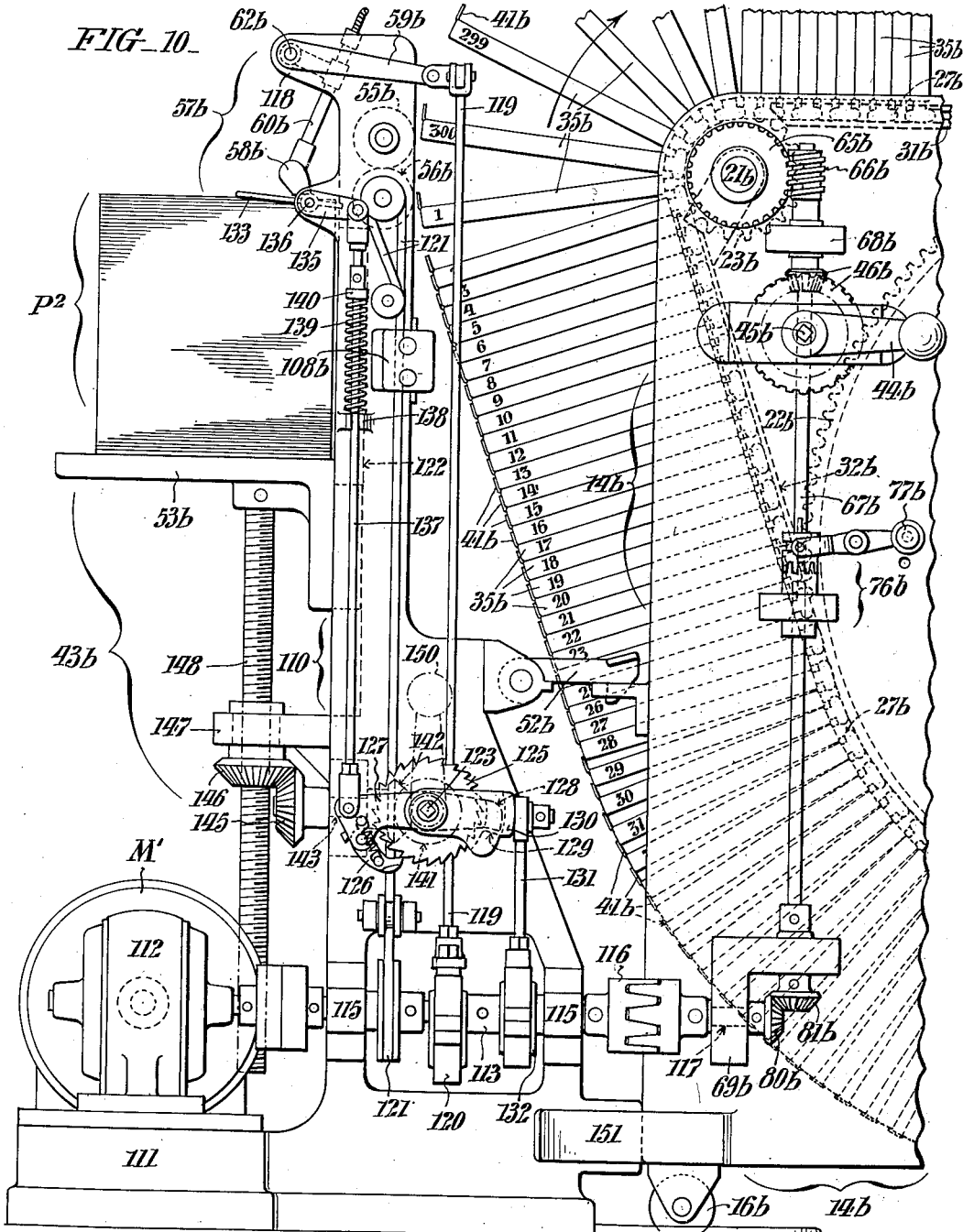

Patented Mar. 18, 1952

2,589,676

UNITED STATES PATENT OFFICE 2,589,676

SHEET DISTRIBUTING MACHINE

Robert J. Crissy, Union, N. J., assignor, by mesne assignments, to Scriptomatic, Inc., Philadelphia, Pa., a corporation of Pennsylvania Application August 5, 1947, Serial No. 766,229

23 Claims. (Cl. 271—11)

This invention relates to sheet distributing machines, i. e., to machines useful in assembling the pages of previously typed or printed multiple sheets of letters, pamphlets or books sequentially in preparation for subsequent stapling or binding, or sorting receivable account sheets, incoming mail, etc.

The chief aim of my invention is to provide a machine of the kind referred to which is simple in construction and compact so as to require a minimum space for its accommodation; which is rapid and therefore highly efficient in operation; and which can be relied on to carry out the work for which it is designed without requiring the attention of any specially trained or skilled help.

Basically, the machine of my invention comprises an endless tray-carrying belt conveyer which is trained about a large and a small wheel, and a sheet feeding means in coordination therewith. The trays are attached, each along one edge, to the conveyer and so proportioned and arranged so as to be kept closed one against the back of the next in rounding the large wheel and while the conveyer traverses the straight portions of the circuit, and to open up as they fan out in rounding the small wheel to successively receive individual sheets advanced to them by hand or by an automatic means.

In connection with a sheet distributing machine having the foregoing attributes, I further aim to provide means which will normally maintain the belt conveyer under tension and which will permit lengthening or shortening of the belt with addition or removal of trays when it is desired to change the capacity of the machine; means for guiding the conveyer along the straight portions of its circuit to preclude vibration of the trays capable of adapting itself to angular changes in accommodation with the adjustments of the conveyer as aforesaid; means whereby the timing of the feeding means can be varied in respect to the conveyer to determine deposit of individual sheets into non-adjacent or selected trays; and drive means with facilities whereby the feeding means can be idled so that the travel of the conveyer may be reversed to reset it in starting position or kept in motion in the normal direction at the completion of a compilation for removal of the collected sheets from the trays as they round the small wheel.

Other objects and attendant advantages will appear from the following detailed description of the attached drawings wherein:

Fig. 1 is a view in side elevation of a sheet distributing machine conveniently embodying my invention in one form.

Fig. 2 is a perspective view of one of the sheet assembling trays of the machine.

Fig. 3 is a fragmentary detail section taken as indicated by the angled arrows III—III in Fig. 1 and drawn to a larger scale.

Fig. 4 is a detail section taken as indicated by the angled arrows IV—IV in Fig. 3.

Fig. 5 is a fragmentary view in side elevation corresponding to Fig. 1 showing an alternative embodiment of my invention.

Fig. 6 is a view in side elevation on a larger scale of a transmission associated with the machine in Fig. 5.

Fig. 7 is a fragmentary view showing the transmission with its cover of its casing removed.

Fig. 8 shows the transmission in vertical section taken as indicated by the angled arrows VIII—VIII in Fig. 7.

Fig. 9 is a fragmentary detail section drawn to a still larger scale and taken as indicated by IX—IX in Fig. 6 and Fig. 10 is a view in side elevation like Fig. 5 of another alternative embodiment of my improved sheet assembling machine.

With more detailed reference first to Figs. 1–4, the numeral 14 designates comprehensively the supporting pedestal of the machine which is in the form of a housing with an open framework 15 enclosed by suitable panels of sheet material, and which, for the purpose of mobility, is provided with casters 16 and a hand bar 17. The framework 16 affords bearings 18 and 19 for transverse shafts 20 and 21 on which are respectively mounted large and small sprocket wheels 22 and 23. There are two sprocket wheels 22 positioned on the shaft 20 one adjacent each end thereof and each sprocket wheel has laterally spaced teeth to engage rollers 24 and 25 which are (Figs. 3 and 4) free to revolve on cross pins 26 connecting endless belt chains 27 and 28. The smaller sprockets 23, it is to be understood, are similarly constructed and arranged on the shaft 21. As instanced in Fig. 1, each bearing 18 is slidably supported on a longitudinal bar 29 of the framework 15 and adjustable therealong by means of a screw spindle 30. By the means just described the chains 27, 28 may be tensioned for tightness and the bearings 18 shifted back or forth if it is desired to remove or add links to decrease or increase the capacity of the machine in a manner which will be readily understood from further description. In the straight portions of their travel between the sprockets 22 and 23, the chains 27 and 28 are confined to guides 31 and 32 of which the former are rigidly supported by the framework 15, and of which the latter are pivotally hung from the sprocket shaft 21 for capacity to shift angularly and thereby accommodate the positional adjustments of the sprocket shaft 20. Corresponding links of the endmost sprocket chains 27 are provided with bracket extensions 33, see Figs. 3 and 4, for supporting between them consecutively numbered trays 35, whereof one is illustrated in perspective, in Fig. 2 having edge walls 36, 37, 38 and 39. As shown, the inner edge wall of the tray 35 has a sheet retaining flange 40, and its outer edge wall 37 is provided with an offset extension 41 designed to partially overlap the corresponding outer edge wall of an adjacent tray as the chains round the larger sprockets 22 and traverse the straight portions of their travel after the manner shown in Fig. 1. By fanning out in arounding the smaller sprockets 23, the trays automatically open up as also shown in Fig. 1 to permit introduction of the sheets successively by the feeding means which is indicated at 43. To facilitate removal of the sheets at the completion of a compilation, each tray is further provided with a finger clearance bight as at 42 in Fig. 2. The machine is operable by means of a hand wheel 44 affixed to one end of an actuating shaft 45 which communicates rotary motion to the sprocket shaft 21 through a train of speed reducing gears 46 within a transmission housing 47 at one side of the pedestal 14. As will be readily seen, the guides 31 and 32 serve to steady the tensioned conveyer chains to insure smooth travel thereof and minimize vibration of the trays. This stabilizing condition is also enhanced by reason of the overlap of the extension 41 of one tray upon the edge wall 37 of the next.

The feeding means 43 already referred to includes a bracket 50 which is connected at one corner to the frame 15 of the standard or pedestal 14 by a hinge 51 so as to be swingable laterally out of the way for a purpose later set forth, and which is lockable in operative position as shown by a retractable latch 52. The bracket 50 has a shelf 53 for supporting a pile P of sheets and affords bearings for a pair of superposed nip rolls 55 and 56 to which the sheets are individually presented by a pick-up means 57 for advance into the opened trays 35. The pick-up means 57 may be of any approved type well known in the art, for example, having as shown, a suction cup 58 at the end of a finger 59 which is intermittently lifted by a lever 60. The finger 59 is pivotally connected to an upright arm 61 on a transverse shaft 62 borne in the bracket 50. The feed means 43 is actuated from the shaft 45 through transmission elements including a bevel gear 65 on said shaft in mesh with a bevel pinion 66 on the upper end of a vertical shaft 67 which is rotatively supported in bearings 68 and 69 within the transmission housing 47. By a flexible connection 70, the rotary movement of shaft 67 is communicated to another transverse shaft 71 which is journalled on the bracket 50 and from which the nip rolls 55 and 56 are in turn driven through a pair of intermeshing spur gears 72 and 73. The spur gear 72 carries a crank pin 75 for imparting oscillating movements to the arm 61 of the pick-up 57 through the medium of a pitman 76. The gears involved in the transmission just described are so designed that the pick-up 57 withdraws one sheet at a time from the top of pile P and presents it to nip rolls 55 and 56. The vertical shaft 67 comprises two sections which are normally coupled by a clutch 76 whereof the movable element is operable by means of a lever handle 77.

To prepare the machine for operation, the clutch 76 is disconnected and the hand wheel 44 turned until the first tray 35 of the series is positioned at the nip rolls 55, 56 as in Fig. 1, whereupon said clutch is shifted to reconnect the two sections of shaft 67, and the pile P of the sheets placed on the shelf 53. With this preparation, the hand wheel 44 is continually turned in the direction of the arrow thereon to advance the conveyer at a uniform rate with successive presentation of the trays 35 open at the rolls 55, 56 to receive the individual sheets of page one of the matter to be compiled presented to said rolls by the pick-up 57. When the pile P is exhausted, another pile of sheets is run off in the same manner. This operation is repeated time after time until all the pages comprising the matter are distributed. If the number of pages should be less than the number of trays, the clutch 76 is disengaged after exhaustion of the pile to idle the feeding means 43 whereupon the conveyer alone is operated until the first tray is brought into receiving position before the nip rolls 55 and 56. The clutch 76 is thereupon closed in readiness for the distribution of the next page. When all of the sheets which are to make up the pamphlets or books are collected, the latch 52 is lifted, the clutch 76 disconnected, and the bracket 50 swung aside (this being permitted by virtue of the flexible shaft connection 70) for the purpose of access to the open trays 35 at the small sprockets 23. Finally, the hand wheel 44 is turned and the sheet packs removed from the trays 35 as they open up in rounding the small sprockets 23.

The capacity of the machine may be increased or decreased if necessary or desired, simply by adding or removing tray carrying links to or from the conveyer chains and first relieving the bearings for the shaft 20 and thereafter readjusting them. In making such changes, the guides 32, by virtue of being hung from the shaft 20, will automatically adapt themselves angularly to suit the new conditions.

In the embodiment of my invention illustrated in Figs. 5-9, the machine is arranged to be driven by a prime mover in the form of an electric motor 44a which is mounted within the pedestal 14a at the bottom, and which through a pair of intermeshing bevel gears 80, 81 communicates rotary motion to a vertical shaft 67a. A worm wheel 66a at the top of shaft 67a in turn imparts motion to an intermeshing worm wheel 65a on the shaft 21a of the small conveyer sprockets (not shown). As in the first embodiment, the vertical shaft 67a comprises two sections which are normally connected by a clutch 76a whereof one component is shiftable by means of a lever handle 77a. In the present instance, the transmission casing 47a contains three parallel shafts 82, 83, and 84 whereof the central one 83 is driven through a pair of bevel gears 85 and 86 from the lower section of vertical shaft 67a. Splined on the shaft 83 within the transmission casing 47a is a spur pinion 87 which is selectively shiftable into mesh with spur gears 88 and 89 respectively on shafts 82 and 84 by means of a fork 90 whereof the shank 91 (Fig. 9) extends through a slot 92 in the frontal wall of said housing. At its protruding end, the fork shank 91 is provided with a manipulating knob 93, see Figs. 6, 7 and 9 and also with a pointer 95 for coordination with position-indicating numerals at the front of transmission housing 47a. In order to prevent accidental displacement of the pinion 87 in the different positions to which it may be shifted, the knob 93 is securable by means of a thumb screw 96 which, after being passed through an aperture in the pointer 95 can be selectively engaged in tapped holes 97, 98 and 99 in the front of the transmission casing 47a. Passing through bearings in one side wall of the transmission casing 47a are short shafts 100 and 101 which are arranged to be driven through mutilated spur gear couples 102, 103 and 104, 105 from the shafts 82 and 84 respectively. The left hand protruding ends of the shafts 83, 100 and 101 are squared as shown for selective connection to them of the flexible shaft 70a by which the feed mechanism 43a is actuated, through a coupling head 106 at the free end of the latter shaft. Current is supplied to the motor 44a by way of a cable 107 (Fig. 5) under control of "on" "off" and "reverse" push buttons in a control box 108 mounted on the side of the pedestal 14a. The circuit arrangement to the control buttons may be of any approved conventional sort and for this reason a showing thereof has been omitted from the drawings. All other component elements of the machine of Figs. 5-9 not specifically referred to but having their counterparts in the first embodiment are, in order to preclude the necessity for repetitive description, identified by the same reference numerals previously employed with the addition however in each instance of the letter "a" for convenience of more ready distinction.

With the machine of Figs. 5-9 set as shown and with the knob 93 in position "1", it will operate in the same manner as the machine in Fig. 1 except for being driven by power from the motor 44a under control of the push buttons, that is to say, individual sheets will be fed from the pile P and inserted into the open trays 35a as they are successively presented at the rolls 55a, 56a. Connection of flexible shaft 70 to stub shaft 100 of the transmission and placement of the knob 93 in position "2" to shift spur pinion 87 on shaft 83 into engagement with the spur wheel 88 on shaft 82 will result in less frequent actuation of the feed mechanism 43a by reason of the interposition of the mutilated gears 102, 103, these latter gears being so proportioned in the present instance to determine delays in the operation of the feeding means 43a so that a sheet is deposited only in every other tray 35a of the conveyer with consequent distribution of the load carried by coupling the flexible shaft 70a with the stub shaft 101 of the transmission and placing the knob 93 in position "3" with incidental shifting of spur pinion 87 on shaft 82 onto engagement with gear 89 on shaft 84, the feed means 43a will be actuated even less frequently than before due to interposition of the mutilated gears 104, 105 which are so proportioned as to determine insertion of a sheet in every third tray 35a of the conveyer. This arrangement is also advantageous in that different trays can be used for different compilations of the sheets.

For larger machines intended for use more especially in book binderies for example, I resort to the construction illustrated in Fig. 10. Here the feeding means 43b and the motor M' are supported by a separate stationary pedestal 110. As shown, the motor M' is mounted on a base extension 111 of the pedestal 110 and through a speed reducer 112 delivers its power to a horizontal power shaft 113 which revolves in spaced bearings 115, said motor being controllable by start and stop push buttons indicated at 108b. At its distal end, the shaft 113 is coupled by means of clutch 116 with a short aligned shaft section 117 rotative in a bearing 69b on pedestal 14b. Through a pair of miter gears 80b, 81b the motion of shaft 117 is transmitted to the two part vertical shaft 67b of which the upper section carries a worm 66b to drive the worm wheel 65b on the shaft 21b of the small conveyer sprockets 23b. The suction element 58b of the pick up means 57b is here of a well known kind in which the supporting arm 60b is secured to a shaft 62b supported in a fixed bearing 118 on the pedestal 110. The shaft 62b is oscillated in accordance with my invention by virtue of the connection of its vibrating arm 59b to the strap rod 119 of an eccentric 120 on power shaft 113. The nip rolls 55b, 56b are in this instance driven through a belt connection 121 from the power shaft 113; while the platform 53b for the sheet pile P² is movable up and down along a guide way 122 in the pedestal 110. The top of the sheet pile P² is maintained at a substantially constant level with respect to the pick up element 58b as a consequence of incremental lift-movements imparted to the platform 53b by the means about to be described. Affixed to the short shaft 123 with rotative support in one side of the pedestal 110 is a ratchet wheel 125 arranged to be picked by a spring-biased pawl 126 which is pivotally connected to an arm 127 free on said shaft. As shown the pawl arm 127 has a tail 128 in the path of a projection 129 on a second arm 130 which is likewise free on the shaft 123, and constantly oscillated as a consequence of being connected to the strap rod 131 of another eccentric 132 on power shaft 113. Functioning of the pawl 126 is controlled by a feeler finger 133 which bears upon the top of the sheet pile P² and which is secured, together with an arm 135, to a rock shaft 136 supported in the pedestal 110. Through a vertical link rod 137 confined to a guide 138 on pedestal 110, the arm 135 is connected to pawl arm 127. A helical spring 139 in compression between the guide 138 and a collar 140 on the rod 137 urges said rod upward to keep the feeler 133 yieldingly in contact with the top of the sheet pile P². Upon slight drop of the feeler finger 113, the pawl arm 127 will be lifted and the pawl 126 pressed by its spring behind a tooth of the ratchet 125 to pick the same as the tail 128 of said arm is struck by the projection 129 on the constantly vibrated arm 130. The intermittent movements are so imparted to the shaft 123 as to communicate through a pair of miter gears 141, 142 to another short shaft 143, and from the latter in turn, through a second miter gear 145, to a miter gear 146. Gear 146 is rotatable but held against endwise movement in a fixed bearing 147 on pedestal 110 and in threaded engagement with a screw stem 148 pendant from the platform 53b. Here, as in the first embodiment of my invention the gearing of the transmission is so designed as to determine insertion of a sheet from the pile P² into each tray 35b of the conveyer. Also as in the first embodiment, I have provided the two part shaft 67b with a clutch 76b having an actuating handle 77b. Resetting of the tray conveyer may be necessary after each run of the machine upon throwing out the clutch 76b, is accomplished by turning a crank handle 44b on shaft 45b which, by means of the bevel gear couple 46b on shaft 45b is connected to the upper section of the shaft 67b, the motion thus induced in the latter being communicated to the sprocket shaft 21b through the worm gear couple 65b, 66b. In order to enable lowering of the platform 53 for placement of a fresh pile of sheets thereon in preparation for restarting, the end of the ratchet shaft 123 is squared as shown for application of a crank handle such as indicated in dot and dash lines at 150. Thus upon retraction of the pawl 126, the shaft 123 can be reversely turned as required to drop the platform 53b. The pedestal 14b is normally held to the pedestal 110 by retractable latches whereof one is indicated at 52b, and held in alignment therewith by ganging projections 151 therein which overlap the base of pedestal 110 at opposite sides. Withdrawal of the pedestal 14b is obviously attended by automatic disconnection of clutch 116. This arrangement is advantageous in that an empty conveyer unit 14b can be substituted for a filled one and the machine can be kept in operation while the filled unit is being emptied.

In addition to the use above described, the tray conveyer unit of either of the three disclosed embodiments may obviously be used alone, i. e. without the sheet feeding unit, for operations such as sorting receivable account sheets, incoming mail, etc.

Having thus described my invention, I claim:

1. In a sheet distributing machine, an endless belt conveyer; large and small wheels about which the conveyer is trained; a series of trays attached to and extending perpendicularly from the conveyer, each tray having an edge wall of a depth to overlap the corresponding wall of the next tray as the conveyer rounds the large wheel and moves along the straight portions of its circuit; feeding means for removing individual sheets from a pile and introducing them into successive trays as the latter fan out and open up in rounding the small wheel; and reversible drive means permitting resetting of the conveyer to starting position after the sheet pile is exhausted.

2. A sheet distributing machine according to claim 1, in which each tray has a hand-clearing bight therein at its swinging edge to facilitate subsequent removal of the collected sheets therefrom.

3. A sheet distributing machine according to claim 1, further including a support with fixed bearings for the shaft of the small wheel; and bearings for the shaft of the large wheel adjustable on the support to take up the slack of the conveyer.

4. A sheet distributing machine according to claim 1, further including guides to which the straight runs of the conveyer are confined.

5. A sheet distributing machine according to claim 1, in which the conveyer comprises a pair of spaced belt chains with links whereto the trays are rigidly connected, and in which the wheels are in the form of sprockets; and further including guides to which the straight runs of the chains are respectively confined.

6. A sheet distributing machine according to claim 1, in which the conveyer comprises a pair of spaced belt chains with links whereto the trays are rigidly connected, in which the wheels are in the form of sprockets; and further including a support with fixed bearings for the shaft of the small wheels, bearings for the shaft of the large wheels adjustable on the support to take up the slack of the conveyer and to permit the addition or removal of links and trays for change in the capacity of the machine; and two sets of guides to which the straight runs of the chains are respectively confined; one set of said guides being rigid on the support and the other set being pivotally hung from the shaft of the small wheels to accommodate angular changes in the angularity of the corresponding straight runs of said chains as the slack of the conveyer is taken up.

7. In a sheet distributing machine, sheet feeding means; an endless belt conveyer; large and small wheels about which the conveyer is trained; a series of sheet collecting trays attached perpendicularly to the conveyer, said trays opening up to permit introduction thereinto of individual sheets taken from a supply pile by the feeding means as they fan out in rounding the small wheel; means for driving the conveyer continuously at uniform speed; means deriving movement from the driving means for actuating the sheet feed means in timed relation to the movement of the conveyer; and means whereby the sheet feed actuating means can be disconnected from the driving means upon exhaustion of the pile to permit re-setting of the conveyer to starting position.

8. A sheet distributing machine according to claim 7, in which there are two sets of the straight guides for the straight runs of the conveyer, one set of guides being fixed and the other set being pivotally hung from the shaft of the small wheel to permit changes in the angularity of the corresponding straight run of the conveyer incident to lengthening or shortening of the conveyer to vary the capacity of the machine.

9. A sheet distributing machine according to claim 7, wherein the sheet collecting trays have outer edge walls of a depth to overlap the corresponding wall of the next successive tray for the retainment of the sheets as the conveyer rounds the large wheels and moves along the straight portions of its circuit.

10. A sheet distributing machine according to claim 7, having reversing means for determining movement of the conveyer in one direction during normal operation or movement of said conveyer in the opposite direction for re-setting to starting position after each complete run when only a portion of the total number of trays is used.

11. A sheet distributing machine according to claim 7, having means whereby the conveyer and the drive means and the sheet supply and feeding means can be retracted relatively to facilitate removal of the collected sheets from the trays at the small wheels.

12. A sheet distributing machine according to claim 7, wherein the belt conveyer is in the form of a sprocket chain, and further including adjustable means whereby the relative positions of the centers of the large and small wheels may be changed so that the capacity of the machine may be varied by removal or addition of links and trays from and to the conveyer.

13. A sheet distributing machine according to claim 7, further including a support with bearings for the shafts of the conveyer wheels; means carried by the support for driving the conveyer; a bracket for the feeding means attached to the support with capacity for being moved out of the way to permit access to the conveyer at the small wheels for convenience of withdrawing the collected sheets from the trays at the small wheel; mechanism on the bracket for actuating the feeding means; and a transmission including a flexible shaft connection between the feed actuating mechanism and the conveyer drive means.

14. A sheet distributing machine according to claim 7, further including a support with bearings for the shaft of the conveyer wheels; means carried by the support for driving the conveyer; a bracket for the feeding means attached to the support with capacity for being moved out of the way to permit access to the conveyer at the small wheel for convenience of withdrawing the collected sheets from the trays, mechanism on the bracket for actuating the feeding means; a transmission including a flexible shaft connection between the feed actuating mechanism and the conveyer drive means; and a clutch whereby said feed actuating means can be idled during emptying of the trays.

15. A sheet distributing machine according to claim 7, in which the sheet feeding means includes a shelf on which the piles of different sheets are successively placed, a pair of nip rolls for advancing sheets individually removed from the pile to the conveyer trays, and a pick up for lifting the individual sheets from the piles and presenting them to the nip rolls for advancement as aforesaid.

16. A sheet distributing machine according to claim 7, further including means whereby timing of the feed means can be changed relative to the movement of the conveyer to permit introduction of the sheets into non-successive trays of the conveyer.

17. A sheet distributing machine according to claim 7, further including a prime mover with interposed drive means to one of the conveyer wheel shafts; means to control the prime mover so that the conveyer is moved in one direction during normal operation of the machine or reversed for re-setting to starting position after each operation when only a portion of the total number of trays are used; transmission mechanism whereby the feeding means is actuated from the conveyer drive means; and means whereby the actuating mechanism for the sheet feeding means can be disconnected from the drive means to permit re-setting of the conveyer.

18. A sheet distributing machine according to claim 7, further including a prime mover with interposed drive means to one of the conveyer wheel shafts; means to control the prime mover so that the conveyer is moved in one direction during normal operation of the machine or reversed for re-setting to starting position when only a portion of the total number of trays are used; transmission mechanism whereby the sheet feeding means is actuated from the conveyer drive means; means whereby the actuating mechanism for the sheet feeding means can be disconnected from the drive means to permit re-setting of the conveyer; a support for the prime mover and the conveyer drive means providing bearings for the shafts of the conveyer wheels; a bracket for the feeding means attached to the support with capacity for being retracted to permit access to the conveyer at the small wheels for convenience of removing the collected sheets from the trays; and a flexible shaft connection between the conveyer drive means on the support and the sheet feeding means.

19. A sheet distributing machine according to claim 7, further including a stationary support for the sheet feeding means; a mobile support for the conveyer and its drive means; means for releasably coupling the conveyer support to the support of the feeding means; a prime mover mounted on the latter support; a power shaft rotative on the latter support through which motion is imparted from the prime mover to the conveyer and to the means for actuating sheet feed means; and a clutch connecting the power shaft to a conveyer drive shaft, said clutch being constructed and arranged to disconnect itself upon withdrawal of the conveyer support from the stationary support of the sheet feeding means.

20. In a sheet distributing machine, a sheet feed means; an endless belt conveyer; large and small wheels about which the conveyer is trained; a series of sheet collecting trays attached perpendicularly to the conveyer, said trays opening up to permit introduction thereinto of individual sheets taken from a supply pile by the feeding means as they fan out in rounding the small wheel; means for driving the conveyer at uniform speed; a stationary support for the sheet feeding means; a separable mobile support for the conveyer; means for releasably coupling the conveyer support to the support for the feeding means; means connected to the driving means for actuating the sheet feed means in timed relation to the movement of the conveyer; and means whereby the means for actuating the sheet feed means can be idled after a full run of the conveyer while the collected sheets are being removed from the trays at the small wheel or while the conveyer is being reset to starting position for another run.

21. A sheet distributing machine according to claim 20, further including a prime mover mounted on the stationary support; a power shaft rotative on the stationary support for transmitting motion from the prime mover to a conveyer drive shaft; and a clutch connecting the conveyer drive shaft to the power shaft, said clutch being constructed and arranged to disconnect itself upon withdrawal of the conveyer support from the stationary support.

22. A sheet distributing machine according to claim 20, further including a prime mover mounted on the stationary support; and a power shaft rotative on the stationary support through which motion is transmitted to the conveyer and to the means for actuating the sheet feed means.

23. A sheet distributing machine according to claim 20, further including a platform for supporting a pile of sheets; pick up means for advancing individual sheets from the pile into the conveyer trays; and means for progressively elevating the platform to maintain the top of the sheet pile at a substantially constant level with respect to the pick up means.

ROBERT J. CRISSY.

REFERENCES CITED

The following references are of record in the file of this patent:

UNITED STATES PATENTS

| Number | Name | Date |
|---|---|---|
| 180,103 | Averell | July 25, 1876 |
| 1,074,964 | Maxwell | Oct. 7, 1913 |
| 1,150,302 | Perkins | Aug. 17, 1915 |
| 1,308,837 | Blakeney | July 8, 1919 |
| 1,421,889 | Augustine | July 4, 1922 |
| 1,461,746 | Augustine | July 17, 1923 |
| 1,610,662 | Pamphilis | Dec. 14, 1926 |
| 1,692,294 | Elder | Nov. 20, 1928 |
| 1,726,010 | Young | Aug. 27, 1929 |
| 1,845,907 | Cook et al. | Feb. 16, 1932 |
| 2,022,088 | Nelson | Nov. 26, 1935 |
| 2,241,168 | Truitt et al. | May 6, 1941 |
| 2,245,113 | Meyer | June 10, 1941 |
| 2,307,150 | Miller et al. | Jan. 5, 1943 |